2,802,007
METHOD OF REDUCING 3-HYDROXYPYRIDINE AND ITS DERIVATIVES

John H. Biel, Milwaukee, Wis., assignor to Lakeside Laboratories, Inc., a corporation of Wisconsin No Drawing. Application May 24, 1954, Serial No. 432,039

13 Claims. (Cl. 260—293.2)

This invention relates to a method for reducing 3-hydroxypyridine and derivatives thereof.

Up to the present time, the synthesis of N-substituted 3-hydroxypiperidines from progenitors has been expensive and difficult and the yields have been low. Catalytic reduction of 3-hydroxypyridine has been attempted and the attempts reported. The work of Cavallito and Haskell reported in J. Am. Chem. Soc., 66, 1166 (1944) showed inability to effect hydrogenation. It has been reported that a quantitative yield of 3-hydroxypiperidine hydrochloride could be produced with platinum oxide catalysts (J. Chem. Eng. China, 15, 80 [1949], C. A. 44, 3993e [1950]), but it has been impossible to confirm this work. See J. Am. Chem. Soc., 74, 1485 (1952).

In carrying out the reduction of the present invention, 3-hydroxypyridine (or an addition salt thereof) is dissolved in a suitable solvent. Water, methanol, ethanol or dioxane are typical examples of inorganic and organic solvents. The solution is then subjected to hydrogenation at high pressures. Pressures of 200 to 4,000 pounds per square inch of hydrogen are regarded as particularly suitable. The hydrogenation should be carried on in the presence of a nickel catalyst, such as Raney nickel and at temperatures ranging from 80–250° C. The resulting 3-hydroxypiperidine compounds are produced in high yields and may be recovered in the form of the free bases.

The following are specific examples of the invention:

Example Ia 3-hydroxypyridine methobromide,

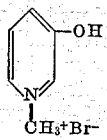

was produced by the following procedure:

To 400 g. of 3-hydroxypyridine dissolved in 1,500 cc. of acetone was added 440 g. of methylbromide and the solution allowed to stand for 20 hours. The precipitate was separated by filtration and washed with cold acetone, yield 653 g. (82%), M. P. 148–150° C. The analysis of the resulting product, calculated for $C_6H_8BrNO$ was, bromine 42.10 and nitrogen 7.37. Analytical results were, bromine 42.80 and nitrogen 7.44.

Example Ib

N-methyl-3-hydroxypiperidine,

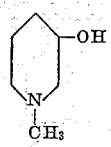

was produced from the 3-hydroxypyridine methobromide by the following procedure:

To 669 g. of 3-hydroxypyridine methobromide in 1,000 cc. of water were added twenty teaspoons of Raney nickel catalyst and the mixture subjected to hydrogenation at 1,800 lbs. of hydrogen and 150° C. After the adsorption of hydrogen was complete, the catalyst was removed by filtration, the filtrate saturated with solid potassium hydroxide and extracted several times with ether. The combined ether extracts were dried with potassium carbonate. The product was collected at 68–70° C. (8 mm.). The yield was 351 g. (87%). The index of refraction was $n_D^{20}$ 1.4733.

Example IIa 3-hydroxypyridine ethobromide,

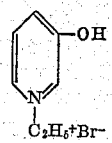

was produced by the following procedure:

To 95.0 g. (1.0 mole) of 3-hydroxypridine dissolved in 100 cc. of isopropyl alcohol at 60° C. was added with stirring 130 g. (1.2 mole) of ethyl bromide. The mixture was refluxed for 16 hours and then cooled in an ice bath. The precipitate was separated by filtration and washed twice with ice cold isopropyl alcohol. The yield was 150 g. (88%); M. P. 105–107° C. The analysis of the resulting product, calculated for $C_7H_{10}BrNO$ was, bromine 39.22 and nitrogen 6.86. Analytical results were, bromine 39.05 and nitrogen 6.78.

Example IIb

N-ethyl-3-hydroxypiperidine,

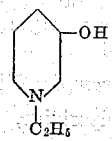

was produced from the 3-hydroxypyridinium ethobromide by the following procedure:

An aqueous solution containing 102 g. (0.50 mole) of 3-hydroxypyridinium ethobromide in 250 cc. of water was subjected to hydrogenation at 800–1,500 lbs. of hydrogen in the presence of five teaspoons of Raney nickel catalyst and at a temperature of 110–125° C. The catalyst was removed by filtration, the filtrate saturated with solid potassium hydroxide and extracted with ether. The ether extracts were dried with potassium carbonate and then distilled. The product was collected at 78–80° C. (7 mm.). The yield was 60.2 g. (93%). The index of refraction was $n_D^{14}$ 1.4777.

Example IIIa

N-phenylethyl-3-hydroxypyridinium bromide,

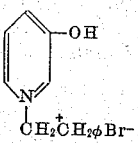

was produced by the following procedure:

To 114 g. (1.2 mole) of 3-hydroxypyridine dissolved in 300 cc. of acetone was added 222 g. (1.2 mole) of phenylethyl bromide and the mixture refluxed for four hours. The precipitate was separated by filtration. The yield was 200 g. (60%); M. P. 195–197° C. The analysis of the resulting product, calculated for $C_{13}H_{13}BrNO$ was, bromine 28.57 and nitrogen 5.00. Analytical results were bromine 28.93 and nitrogen 5.23.

Example IIIb

N-phenylethyl-3-hydroxypiperidine,

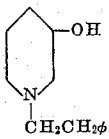

was produced from the phenyl-ethyl-3-hydroxy-pyridinium bromide by the following procedure:

A solution containing 100 g. (0.35 mole) of phenyl-ethyl-3-hydroxy-pyridinium bromide in 250 cc. of water was reduced with five teaspoons of Raney nickel catalyst at a pressure of 1,500 lbs. of hydrogen and at a temperature of 125° C. The basic aminoalcohol was isolated in the usual manner and collected by distillation at 145–148° C. (2.0 mm.). The yield was 55.6 g. (91%). The index of refraction was $n_D^{25}$ 1.5418. The analysis of the resulting product, calculated for $C_{13}H_{18}NO$ was nitrogen 6.86. Analytical results were nitrogen, 7.03.

Example IVa 3-hydroxypiperidine,

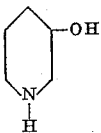

was produced by the following procedure:

A solution containing 47.5 g. (0.50 mole) of 3-hydroxypyridine in 300 cc. of water was subjected to hydrogenation at 1,500 lbs. of hydrogen and 125° C. in the presence of 5 teaspoons of Raney nickel. The basic aminoalcohol was isolated in the usual manner and collected by distillation at 102–105° C. (17 mm.). The yield was 30.5 g. (60.4%). The analysis of the resulting product, calculated for $C_5H_{10}N$ was nitrogen 14.00. Analytical results were, nitrogen 13.40.

Example IVb

N-n-butyl-3-hydroxypiperidine,

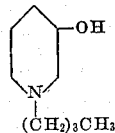

was produced by the following procedure:

A solution containing 142.5 g. (1.5 mole) of 3-hydroxypyridine, 241.4 g. (1.75 mole) of n-butyl bromide in 400 cc. of acetone was refluxed for 24 hours. The acetone was then removed in vacuo and the oil residue subjected to hydrogenation in water at 1,500 lbs. of hydrogen in the presence of Raney nickel and at a temperature of 115° C. The basic amino alcohol was isolated in the usual manner and distilled; B. P. 104–107° C. (12 mm.). The yield was 170 g. (72%). The analysis of the resulting product, calculated for $C_9H_{19}NO$ was, nitrogen, 8.92. Analytical results were nitrogen 8.98. The index of refraction was $n_D^{20}$ 1.4712.

Example V

N-ethyl-3-hydroxypiperidine,

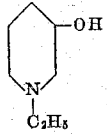

was produced by the following procedure:

In place of the water as the solvent in Example IIb, ethyl alcohol was used.

To 209 gm. of 3-hydroxypyridine in 450 cc. of absolute ethyl alcohol, there was added Raney nickel catalyst and the mixture subjected to hydrogenation at 130° C. and 2,000 pounds of hydrogen. After absorption of hydrogen was complete, the Raney nickel was filtered from the cooled mixture. To the solution there was added 60 gm. of sodium methylate and the resulting sodium bromide filtered off. The ethanol was removed by distillation and the product vacuum distilled for purity. The yield was 82 gm. or 64%.

The five specific examples may be structurally signified as follows:

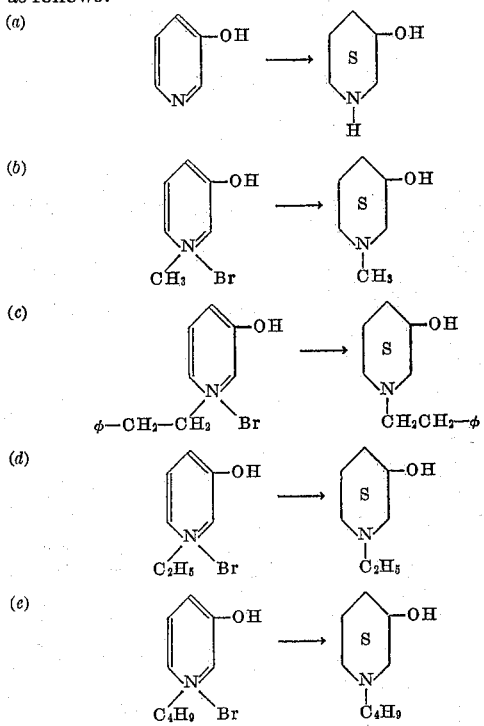

The general reaction takes the following form:

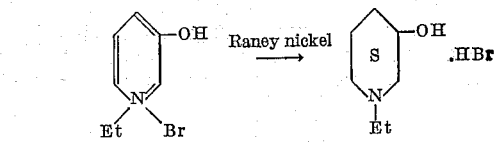

If a compound such as N-phenylethyl-3-hydroxypyridinium bromide is employed, it will be noted from Example III that the corresponding piperidine compound is produced. If, however, the corresponding phenylmethyl compound is employed as a starting material, the reaction will simply give 3-hydroxypiperidine according to the following equation:

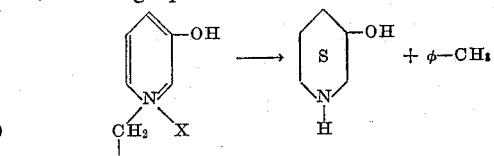

This is because N-benzyl groups are easily removed by hydrogenation.

Obviously, this material may be used as a starting material, providing the ultimate objective is the 3-hydroxypiperidine, but if the phenylpiperidines are desired, the pyridine progenitor should be of the formula:

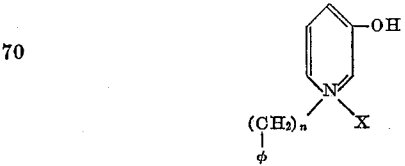

where $n$ is greater than 1.

While bromides are used in all of the examples, other halides are satisfactory, and in fact X may be any active negative radical such as acetate, nitrate, sulfate, etc.

The foregoing detailed description has been given for clearness of understanding only and no unnecessary limitations should be understood therefrom as modifications will be obvious to those skilled in the art.

I claim:

1. The process which comprises contacting a starting compound of the group consisting of compounds of the formulae

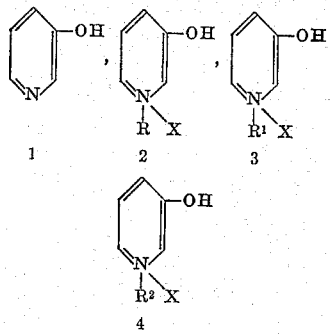

wherein R is a lower alkyl group, $R^1$ is a phenyl lower alkyl group in which the alkyl moiety is higher than methyl, $R^2$ is benzyl and X is a negative radical, with hydrogen at an elevated pressure and temperature in the presence of a nickel catalyst to produce a compound of the group consisting of compounds of the formulae

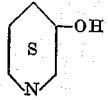

from starting compounds 1 and 4,

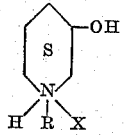

from starting compound 2, and

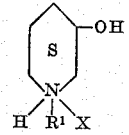

from starting compound 3, R, $R^1$, $R^2$ and X having the significance previously assigned.

2. The process which comprises reacting a compound of the formula

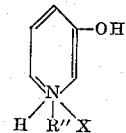

wherein R" is benzyl and X is a negative radical, with hydrogen in the presence of a nickel catalyst under elevated pressure and temperature to produce 3-hydroxypiperidine.

3. The process of claim 1 in which X is a halide.

4. The method of claim 1 in which the nickel catalyst is a sponge nickel catalyst.

5. The method of claim 1 in which the hydrogenation is carried out in an aqueous organic solution.

6. The method of claim 1 in which the hydrogenation is carried out in the presence of water.

7. The method of claim 1 in which the pressure is upwards of about 200 pounds per square inch.

8. The method of claim 1 in which the temperature is upwards of 80° C.

9. The method of claim 1 in which the pressure is between 200 and 4,000 pounds per square inch and the temperature is between 80° and 250° C.

10. The method which comprises hydrogenating 3-hydroxypyridine methobromide under elevated temperature and pressure in the presence of water and of a sponge nickel catalyst.

11. The method which comprises hydrogenating 3-hydroxypyridine ethobromide under elevated temperature and pressure in the presence of water and of a sponge nickel catalyst.

12. The method which comprises hydrogenating N-phenylethyl-3-hydroxypyridinium bromide under elevated temperature and pressure in the presence of water and of a sponge nickel catalyst.

13. The method which comprises hydrogenating 3-hydroxypyridine under elevated temperature and pressure in the presence of water and of a sponge nickel catalyst.

References Cited in the file of this patent

UNITED STATES PATENTS 1,870,071   Schoeller _____ Aug. 2, 1932

OTHER REFERENCES

Kao: Journal of Chemical Engineering of China, vol. 15, p. 180, abstracted at Chemical Abstracts, vol. 44, col. 3993(e), 1949.

Biel et al.: Journal of the American Chemical Society, vol. 74, pages 1485–1488, August 8, 1951.